United States Patent [19]

Tockey, Jr.

[11] Patent Number: 4,527,350

[45] Date of Patent: Jul. 9, 1985

[54] WORM CARRIERS

[76] Inventor: Darwin R. Tockey, Jr., Rte. 2, Box 153, Bishop, Calif. 93514

[21] Appl. No.: 503,763

[22] Filed: Jun. 13, 1983

[51] Int. Cl.³ .............................................. A01K 97/00
[52] U.S. Cl. ........................................ 43/55; 43/54.1; 206/204; 224/920
[58] Field of Search .................. 43/55, 54.1, 25.2; 206/204, 205; 239/42, 57; 224/920

[56] References Cited

U.S. PATENT DOCUMENTS

| 886,337 | 5/1908 | Balken | 43/55 |
| 4,034,118 | 7/1977 | Martin | 206/205 |
| 4,073,085 | 2/1978 | Stremeckus | 43/54.1 |
| 4,418,490 | 12/1983 | Ancona | 43/25.2 |

Primary Examiner—Nicholas P. Godici
Assistant Examiner—C. McKee

[57] ABSTRACT

An evaporation cooled worm carrier consisting of a plastic container divided into substantially equal halves that are hinged, connected and latched in a closed position in combination with ventilation evaporation slots in the container and a separate removable moisture-absorbent bait pouch into which bait is inserted so that bait pouch can be dipped into water for maintaining the bait alive and cool without the use of dirt or bedding for extended periods of time.

1 Claim, 4 Drawing Figures

WORM CARRIERS

BACKGROUND OF THE INVENTION

The present invention relates to worm carriers used by fishermen and in particular to a portable worm carrier used to transport and keep cool worms, nitecrawlers and other baits requiring moisture to sustain life.

The main objection to conventional worm or bait carriers in general is the digging and searching required to take bait from carrier while fishing. Worms are constantly working their way to bottom thereof. Another complaint regarding conventional worm carriers in general is the requirement of matter such as dirt or bedding, to hold moisture necessary to sustain life of bait. Dirt being the most common material used has a tendency to be messy, usually leaving fingers encrusted with dirt requiring cleanup after baiting a hook. The size of conventional worm carriers in general necessary to carry bait and dirt or bedding is large and cumbersome because of extra space required for dirt or bedding.

The following patents are disclosed to be representative of the prior art in this field; U.S. Pat. Nos. 4,008,540; 2,149,482 and 1,150,776.

SUMMARY OF THE INVENTION

Therefore, it is the principle object of this invention to provide a worm carrier to the fisherman that does not require the use of matter such as dirt or bedding to keep bait cool, moist and lively.

It is the object of this invention to provide a worm carrier to the fisherman that has a separate removable moisture absorbent bait pouch that can be saturated and re-saturated with water at required intervals, using one hand and with ease.

It is the object of this invention to provide a worm carrier to the fisherman that houses bait in a moisture-absorbent bait pouch without dirt or bedding, allowing access to bait without digging or searching.

It is the object of this invention to provide a worm carrier to the fisherman that is easily accessible and operational with one hand.

A further object of this invention is to provide to the fisherman a worm carrier with ventilation slots or holes allowing natural evaporation to take place in conjunction with the moisture absorbent bait pouch keeping bait cool and lively for extended periods of time.

Still a further object of this invention is to provide to the fisherman a worm carrier that is lightweight, durable, and of dimensions unlikely to become cumbersome or uncomfortable while fishing.

BRIEF DESCRIPTION OF THE DRAWINGS

A preferred form of the present invention is illustrated in which.

DETAILED DESCRIPTION OF THE INVENTION

Figure 1:
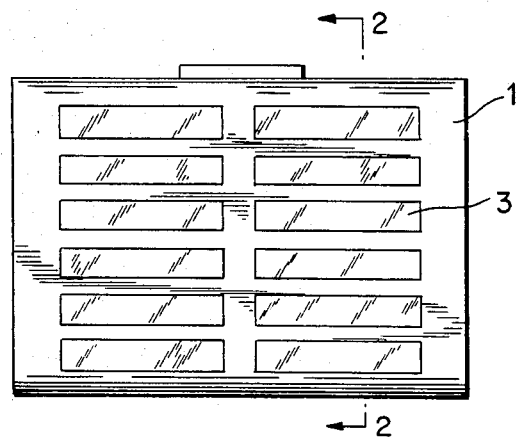
FIG. 1 is a front view of worm carrier.

FIG. 1 shows the main housing (1) of the invention and (3) the evaporation ventilation slots that allow air passage to, from and through moisture-absorbent bait pouch (2).

Figure 2:
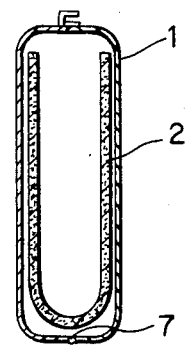
FIG. 2 is a side view, cut away internal view taken along lines 2—2 of FIG. 1.

FIG. 2 shows the relationship in a closed position of the moisture absorbent bait pouch (2) and worm carrier main housing (1).

Figure 3:
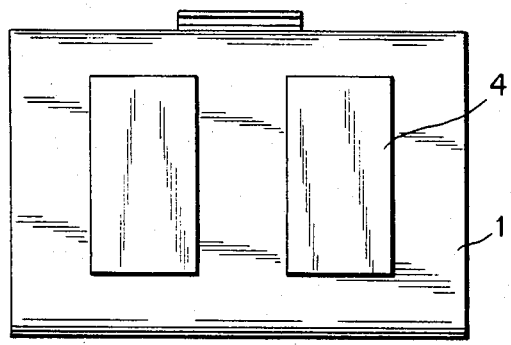
FIG. 3 is a back view of worm carrier.

FIG. 3 shows a belt and or clothing clip (4) used to secure main housing (1) to the fisherman's waist or clothing.

Figure 4:
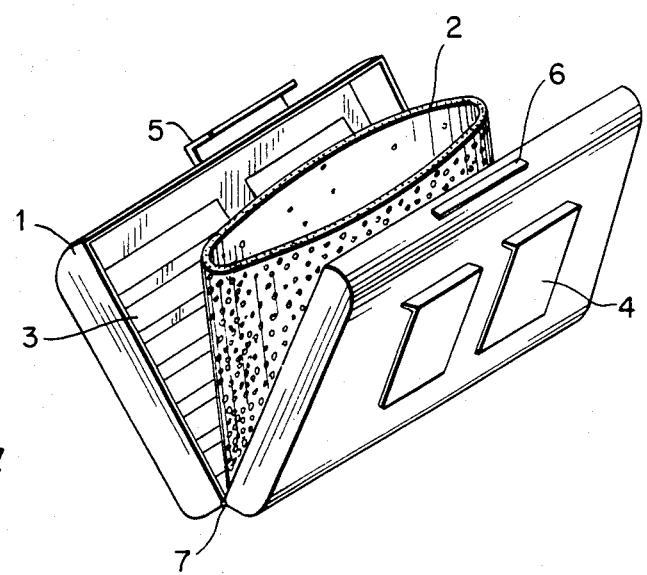
FIG. 4 is a perspective top view of worm carrier in an open position.

FIG. 4 shows moisture-absorbent bait pouch (2) and its relationship to the main housing of worm carrier (1) in an open accessible position. FIG. 4 shows the bait pouch (2) as a removable component of the main housing of the worm carrier (1).

Ventilation evaporation slots (3) provide necessary exposed space to allow evaporation to take place, cooling bait contained in bait pouch (2). Moisture-absorbent bait pouch (2) is most easily made from polyurethane foam but any material with similar characteristics will suffice. Polyurethane foam has many unique characteristics. It is non-toxic to bait; has a desirable porous composition; it is flexible, resilient and has a long life when used as a moisture-absorbent life-sustaining bait pouch in connection with this invention. FIG. 4's main housing of worm carrier (1) is most easily made from polypropolene plastic by injection molding, although any material suitable for making a lightweight, vented container will suffice such as aluminum, rubber, fiberglass, etc. FIG. 4 shows hinge (7) part of the main housing (1) in that the thin connection between the substantially equal halves of worm carrier housing (1) is known to persons familiar with plastics as a "living hinge" (7) and will withstand repeated and excessive use without collapse or fatigue. Hinge (7) is shown in a closed position in FIG. 2. FIG. 4 shows latch (5) in an open position, when closed it is secured by latch slot (6) at FIG. 4.

The illustrations and descriptions are a preferred form of this invention. Many changes may be made in size, shape and material and it should be realized that various changes may be made without departing from the contributions of this invention.

What I claim is:

1. A portable evaporation cooled worm carrier comprising a main housing of light-weight durable rigid plastic material having ventilation slots, said housing including clip means for attachment to the clothing of a user at a position convenient for access with one hand, said housing being hingedly separable and containing a removable bait pouch, said pouch being moisture-absorbent and made of a flexible, resilient, porous, and non-toxic material which enables worms to remain cool and healthy for extended periods of time without the use of bedding materials.

* * * * *